(12) United States Patent
Haag

(10) Patent No.: US 12,072,446 B2
(45) Date of Patent: Aug. 27, 2024

(54) LIDAR DEVICE INCLUDING AN ACCELERATED RUNTIME ANALYSIS

(71) Applicant: Robert Bosch GmbH, Stuttgart (DE)

(72) Inventor: Norman Haag, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 630 days.

(21) Appl. No.: 17/049,813

(22) PCT Filed: Jul. 8, 2019

(86) PCT No.: PCT/EP2019/068271
§ 371 (c)(1),
(2) Date: Oct. 22, 2020

(87) PCT Pub. No.: WO2020/038645
PCT Pub. Date: Feb. 27, 2020

(65) Prior Publication Data
US 2021/0199776 A1    Jul. 1, 2021

(30) Foreign Application Priority Data

Aug. 22, 2018 (DE) .......................... 102018214182.7

(51) Int. Cl.
*G01S 7/481*    (2006.01)
*G01S 7/4863*   (2020.01)
*G01S 7/4865*   (2020.01)

(52) U.S. Cl.
CPC .......... *G01S 7/4817* (2013.01); *G01S 7/4816* (2013.01); *G01S 7/4863* (2013.01); *G01S 7/4865* (2013.01)

(58) Field of Classification Search
CPC ............................ G01S 7/4817; G01S 7/4863
See application file for complete search history.

(56) References Cited

U.S. PATENT DOCUMENTS

| | | | |
|---|---|---|---|
| 2015/0378023 A1 | 12/2015 | Royo Royo et al. | |
| 2016/0139402 A1 | 5/2016 | Lapstun | |
| 2016/0291154 A1* | 10/2016 | Nehmadi | G06V 20/584 |
| 2016/0292905 A1 | 10/2016 | Nehmadi et al. | |

(Continued)

FOREIGN PATENT DOCUMENTS

| | | |
|---|---|---|
| CN | 106443635 A | 2/2017 |
| CN | 107272014 A | 10/2017 |

(Continued)

OTHER PUBLICATIONS

International Search Report for PCT/EP2019/068271, Issued Oct. 25, 2019.

*Primary Examiner* — Isam A Alsomiri
*Assistant Examiner* — Joseph C Fritchman
(74) *Attorney, Agent, or Firm* — NORTON ROSE FULBRIGHT US LLP; Gerard A. Messina

(57) ABSTRACT

A LIDAR device for scanning a scanning area. The LIDAR device includes a transmitting unit for generating beams and for deflecting the beams along the scanning area, and a receiving unit including at least one detector for receiving reflected beams. Individual sections of the detector are consecutively activatable at defined intervals for the detection of the reflected beams, or the reflected beams being deflectable onto individual sections of the detector by a deflector at a changing deflection angle. A control unit and a receiving unit are also provided.

9 Claims, 3 Drawing Sheets

(56) References Cited

U.S. PATENT DOCUMENTS

| | | | |
|---|---|---|---|
| 2017/0176579 A1 | 6/2017 | Niclass et al. | |
| 2017/0350979 A1* | 12/2017 | Uyeno | G01S 17/10 |
| 2018/0038961 A1* | 2/2018 | Smits | G01S 17/931 |
| 2019/0011567 A1* | 1/2019 | Pacala | G06V 20/58 |
| 2019/0293956 A1* | 9/2019 | Khachaturian | G01S 7/4914 |
| 2019/0369216 A1* | 12/2019 | Anderson | G01S 7/4863 |

FOREIGN PATENT DOCUMENTS

| | | |
|---|---|---|
| CN | 108027425 A | 5/2018 |
| DE | 102016004334 A1 | 10/2017 |
| DE | 102016211013 A1 | 12/2017 |
| DE | 102016223892 A1 | 6/2018 |
| EP | 2957926 A1 | 12/2015 |
| JP | 2001194458 A | 7/2001 |
| JP | 2007101342 A | 4/2007 |
| JP | 2007316016 A | 12/2007 |
| JP | 2013036928 A | 2/2013 |
| JP | 2014059301 A | 4/2014 |
| JP | 2017195569 A | 10/2017 |

\* cited by examiner

LIDAR DEVICE INCLUDING AN ACCELERATED RUNTIME ANALYSIS

FIELD

The present invention relates to a LIDAR device for scanning a scanning area, including a transmitting unit for generating beams and for deflecting the beams along the scanning area, and including a receiving unit including at least one detector for receiving reflected rays. The present invention furthermore relates to a control unit as well as a receiving unit.

BACKGROUND INFORMATION

Light detection and ranging (LIDAR) devices include transmitting units for emitting beams, and receiving units for detecting the beams previously reflected in a scanning area. Detectors are used for detecting the reflected beams. These are usually used to ascertain a runtime of the incoming beams for the respective pixels of the detector. For example, photodiodes or CCD sensors may be used as detectors.

To achieve a high depth resolution or range resolution of the detector, it is necessary in the process to read out the detector accordingly quickly and frequently. The respective pixels or diodes may ideally be read out in parallel.

CCD sensors may so far only be used conditionally as detectors since the read-out speed is low compared to detector arrays, resulting in a limited depth resolution.

SUMMARY

An object of the present invention is to provide, in particular, a LIDAR device which allows a runtime analysis with unconditional use of conventional CCD sensors.

This object may be achieved with the aid of the example embodiments of the present invention. Advantageous embodiments of the present invention are described herein.

According to one aspect of the present invention, a LIDAR device for scanning a scanning area is provided. In accordance with an example embodiment of the present invention, the LIDAR device includes a transmitting unit for generating beams and for deflecting beams along the scanning area. The LIDAR device furthermore includes a receiving unit including at least one detector for receiving reflected beams, individual sections of the detector being consecutively activatable at defined intervals for the detection of the reflected beams, or the reflected beams being deflectable at a changing deflection angle by a deflector onto individual sections of the detector.

According to one further aspect of the present invention, a control unit for operating a LIDAR device is provided. In accordance with an example embodiment of the present invention, the control unit is configured to control a deflector of the LIDAR device or a detector of the LIDAR device. The control unit may additionally be designed as an evaluation unit. The control unit may preferably use the signal received from the detector to carry out a further processing. In particular, the further processing may take place in a highly parallel manner and include processors operating in parallel, such as for example GPUs or FPGAs.

According to one further aspect of the present invention, a receiving unit, in particular for a LIDAR device, is provided. In accordance with an example embodiment of the present invention, the receiving unit includes a detector, individual sections of the detector being successively activatable at a uniform speed for the detection of reflected beams, or the individual sections of the detector being irradiatable with reflected beams by a deflector at a uniformly changing deflection degree.

Due to the LIDAR device and the receiving unit used, it is possible to guide the beams, with the aid of the deflector, at different times onto different locations on the chip or the detector. In this way, a runtime analysis in the chip itself may be dispensed with, so that quickly operating detectors are not necessary. In particular, the requirements with regard to the read-out speed may be reduced by the LIDAR device.

In this way, the runtime may be encoded into a location within the detector, so that the runtime analysis is transformed to an image analysis. As an alternative or in addition, it is possible to consecutively switch individual lines of the detector to be active, instead of scanning across the detector or sensor using the received beams.

The beams are preferably deflected across the detector at a constantly changing deflection degree. In this way, reflected beams may be imaged from a minimal distance, for example, in an edge section of the detector, and the beams reflected back from a maximum distance may be guided onto an opposing edge section. The entire surface of the detector may thus serve as an indicator for the different possible runtimes of the reflected beams. Based on the location or the section which detects the reflected beams, a runtime of the corresponding beams may be derived.

The deflector may, for example, change the degree of the deflection of the incoming beams along the surface of the detector at a constant speed. For example, during an emission of the beams, the deflector may set the degree of the deflection in such a way that the reflected beams are guided onto an edge section or a corner of the detector. The degree of the deflection continuously changes further with increasing time, until the time which reflected beams require to arrive from a maximum distance of the LIDAR device back at the detector is reached. Thereafter, the deflector may again align the deflection degree with the edge of the detector surface. The deflector may arbitrarily set the deflection degree in the process, by which the incoming beams are guided to defined positions or sections of the detector as a function of their runtime. In the process, the deflection of the beams arriving at the detector may be designed in two dimensions along the entire surface of the detector.

Based on the position of the beams detected at the detector, the runtime may technically be easily assigned, so that the detector no longer has to be read out completely by an evaluation unit. Rather, an identification of the section of the detector which recognized the beam is sufficient for ascertaining the runtime of the corresponding beam, and thus the distance.

The deflection of the beams onto the detector may take place by the action of the deflector, or by a corresponding partial activation and deactivation of individual areas of the detector. As a result of the activation and deactivation of different sections of the detector, the deflection function of the deflector may be emulated by controlling individual pixels or surface sections of the detector.

According to one exemplary embodiment of the present invention, the at least one detector is designed as a CCD sensor or as a detector array. Through the use of a detector array instead of an individual detector, the measurement of the incoming beams may be configured to be highly parallel, and thereby the efficiency may be increased. In particular, it no longer has to be possible to read out the detector quickly and frequently to generate a corresponding depth resolution. The depth resolution comes solely from the beam movement via the sensor.

As a result of the use of a CCD sensor or CCD chip, an inexpensive and high resolution alternative to detector arrays may be implemented. The CCD sensor may be activated in sections or row by row. The activated sections may detect incoming light or incoming beams. By alternating the activated sections according to defined constant or variable time segments, a runtime may be assigned to the ascertained beams as a function of which sections detect the incoming beams. In the process, the complete signal or the reflected beams may be imaged on the entire CCD sensor. In the process, the detector pixels may be switched to be sensitive, for example row by row. The advantage of this design is that a deflector may be dispensed with.

According to one further embodiment of the present invention, the individual sections of the detector have a punctiform, planar, or linear design. The sections may thus be flexibly activated by a control unit or an evaluation unit.

For example, this may be used for the detection of an entire laser line, a so-called vertical flash. In the process, the entire laser line is deflected, and thus the runtime is detected in one direction, and the location is detected in the other direction, on a two-dimensional sensor. As a result, the principle is highly parallel, and the obtained signal is preferably suitable for further processing in parallel processors, such as GPUs or FPGAs.

According to one further exemplary embodiment of the present invention, the deflector is an acousto-optical modulator. Depending on the design, the receiving unit may include a deflector, in addition to the detector. The deflector may be implemented in a variety of ways in the process. For example, acousto-optical deflectors, micromirrors or other deflectors may be used. These may preferably be coupled to a control unit and be controllable thereby. The deflector guides the incident light onto one or multiple selected pixel(s), or a selected line of the detector. In the process, the deflector changes the degree of the deflection at a constant speed. In this way, the runtime of the incoming beam is encoded in the location of the pixel or of the line, and may subsequently be processed by image processing. Based on the local distribution of the detected beams on the detector surface, a runtime may be assigned to the detected beams.

According to one further embodiment of the present invention, the LIDAR device includes a control unit which is connected to the detector and/or the deflector. In this way, an active control of the deflector and/or of the detector by the control unit may take place. In particular, a continuous variation of the irradiated or activated areas of the detector may be implemented by the control unit.

According to one further specific embodiment of the present invention, each section of the detector is activatable or irradiatable at least once within a runtime period corresponding to a range of the LIDAR device. The achievable depth resolution of the detector embodiment (or how many different runtimes may be detected) in general depends on the number of the detector pixels in the scanning direction along the detector surface, and on the scanning frequency. For LIDAR ranges in the range of approximately 10-200 m, for example, a light running time of 0.7-1.3 µs is to be expected. In this way, the entire detector may be scanned within this time period. This means that the deflector frequency according to this example is in the range of approximately 770 kHz. In this way, non-mechanical deflectors are preferably usable in a LIDAR application. Such deflectors may be acousto-optical modulators, for example.

According to one further specific embodiment of the present invention, at least two beams, reflected with temporal offset, of different activated sections of the detector are detectable, or are guidable by the deflector onto different sections of the detector, or are consecutively guidable onto the detector. In this way, the repetition rate may be reduced at the expense of the resolution by detecting multiple signals within one detector revolution. The principle is freely scalable in the process and may be adapted to the technical specifications. In the process, multiple beams may be guided in parallel or offset onto different areas of the detector in each case.

As an alternative or in addition, the generated beams may be consecutively emitted into the scanning area in a pulse-like manner. These beam pulses may be measured within a measuring cycle and thus be temporally consecutively imaged in a scanning manner on the detector.

A corresponding receiving unit is not limited only to LIDAR devices or applications and may, in general, be used with all applications which carry out runtime measurements of beams.

Preferred exemplary embodiments of the present invention are described in greater detail hereafter based on highly simplified schematic representations.

DETAILED DESCRIPTION OF EXAMPLE EMBODIMENTS

Figure 1:
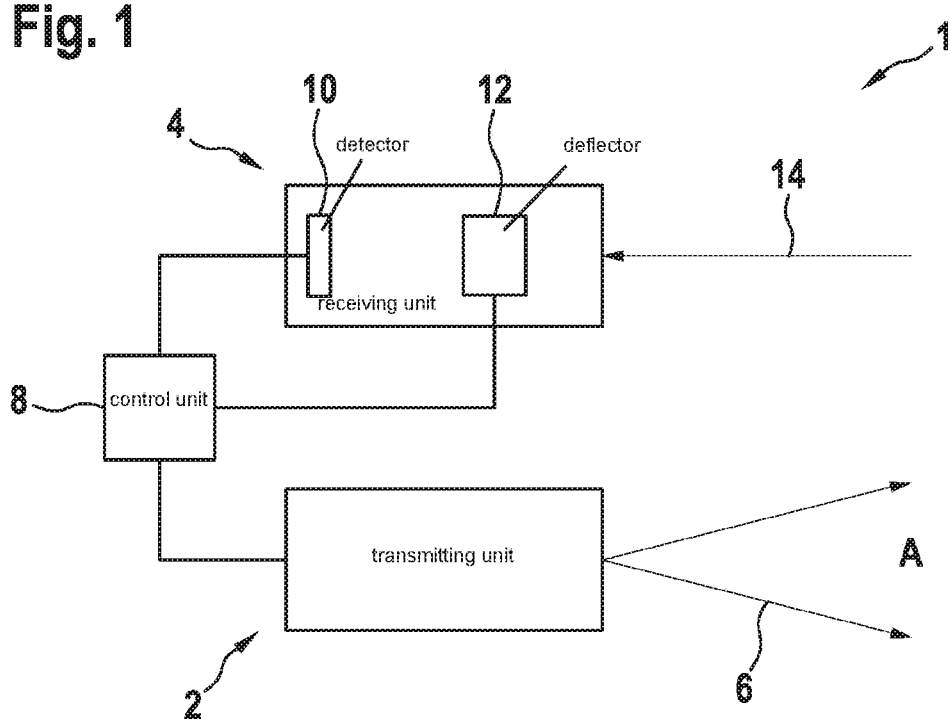
FIG. 1 shows a schematic representation of a LIDAR device according to one exemplary embodiment of the present invention.

FIG. 1 shows a schematic representation of a LIDAR device 1 according to an exemplary embodiment of the present invention. LIDAR device 1 includes a transmitting unit 2 and a receiving unit 4.

Transmitting unit 2 is used to generate and emit beams 6 along a scanning area A. For example, the generated beams 6 may be designed as laser beams. For this purpose, transmitting unit 4 includes a laser, which is not shown for the sake of simplicity. Transmitting unit 2 may generate and emit beams 6 at a defined pulse frequency. This may be coordinated and initiated by a control unit 8.

Receiving unit 4 includes a detector 10 and a deflector 12. Beams 14 arriving at receiving unit 4 or reflected in scanning area A are guided onto a deflector 12 by receiving unit 4.

Deflector 12 is implemented as an acousto-optical modulator here and is controlled by control unit 8. The incoming beams 14 are guided by deflector 12 onto continuously alternating sections of detector 10, whereby a runtime analysis may be carried out, based on the location on detector 10 which detects beams 14.

Figure 2:
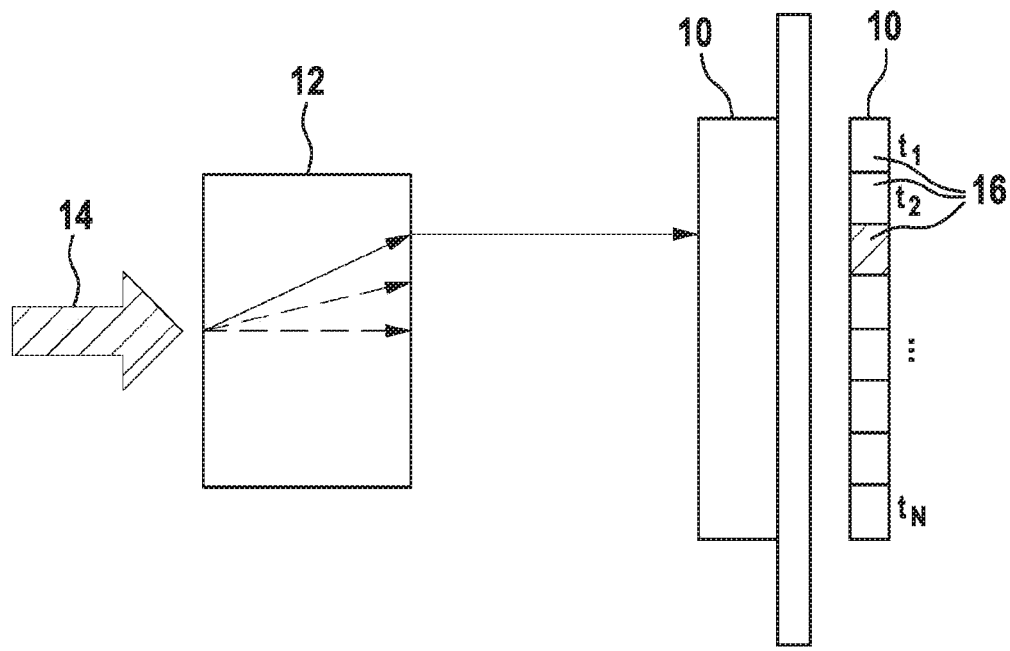
FIG. 2 shows a schematic representation of a receiving unit according to a first exemplary embodiment of the present invention.

FIG. 2 shows a schematic representation of a receiving unit 4 according to a first exemplary embodiment of the present invention. The deflection degree of incoming beams 14 by deflector 12 is changed at a constant speed.

Detector 10 is shown as a line detector for the sake of clarity, to illustrate the functional principle. Detector 10, however, is not limited to this exemplary embodiment.

Due to the deflection degree of the incoming beams 14 changing over time, it is possible, proceeding from point in time $t_0$ of the beam generation, to assign a time to each detector section 16, which the incoming beam 14 requires. According to the example, sections 16 of detector 10 are configured as detector pixels. A first detector pixel thus corresponds to a point in time t1, which corresponds to the shortest runtime of beams 14, and thus to the shortest measurable distance. Accordingly, all detector pixels 16 are encoded with a runtime $t_1$-$t_N$, so that a runtime may be ascertained, depending on which detector pixel 16 detects the incoming beams 14.

According to this exemplary embodiment, the incident light or beams 14 may be deflected by deflector 12 as a function of the running time of light 14. In this way, the light impacts on a different pixel 16 of detector 10 depending on the runtime. Thereafter, the runtime may be derived from the intensity distribution.

Figure 3:
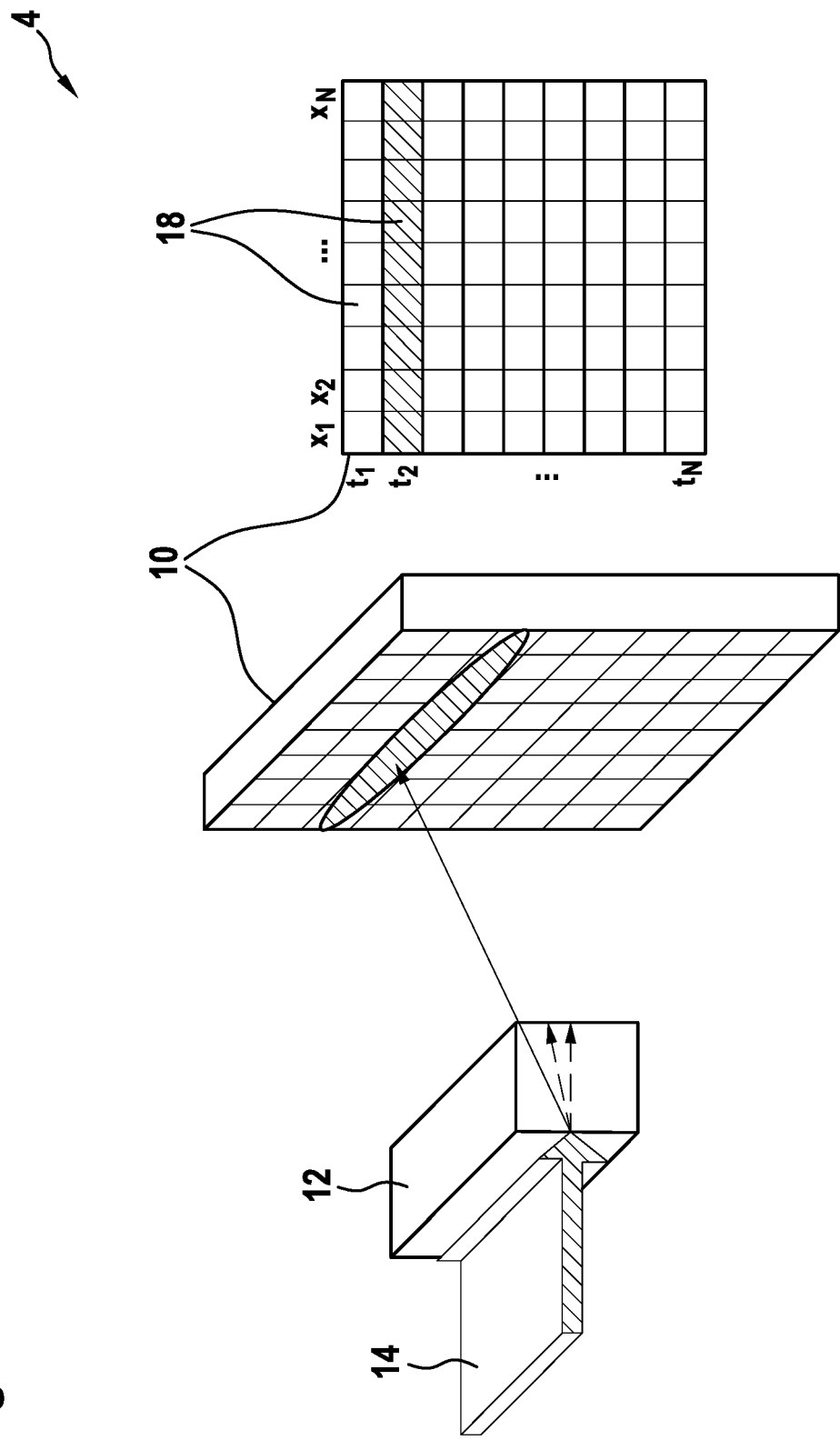
FIG. 3 shows a schematic representation of a receiving unit according to a second exemplary embodiment of the present invention.

FIG. 3 shows a schematic representation of a receiving unit 4 according to a second exemplary embodiment of the present invention. In contrast to the first exemplary embodiment, receiving unit 4 includes incoming beams 14 designed as a vertical laser line, which are guided by deflector 12 onto a detector 10.

Detector 10 may be implemented as a CCD sensor here. Beams 14 are guided as a vertical line onto sections 18 of detector 10. Sections 18 are designed as lines of detector 10 here, so that a piece of time information or a respective runtime $t_1$-$t_N$ is assigned to a line 18. The respective columns $x_1$-$x_N$ may be used for additional functions. For example, in this way it is possible to detect the runtime and different locations in parallel.

Figure 4:
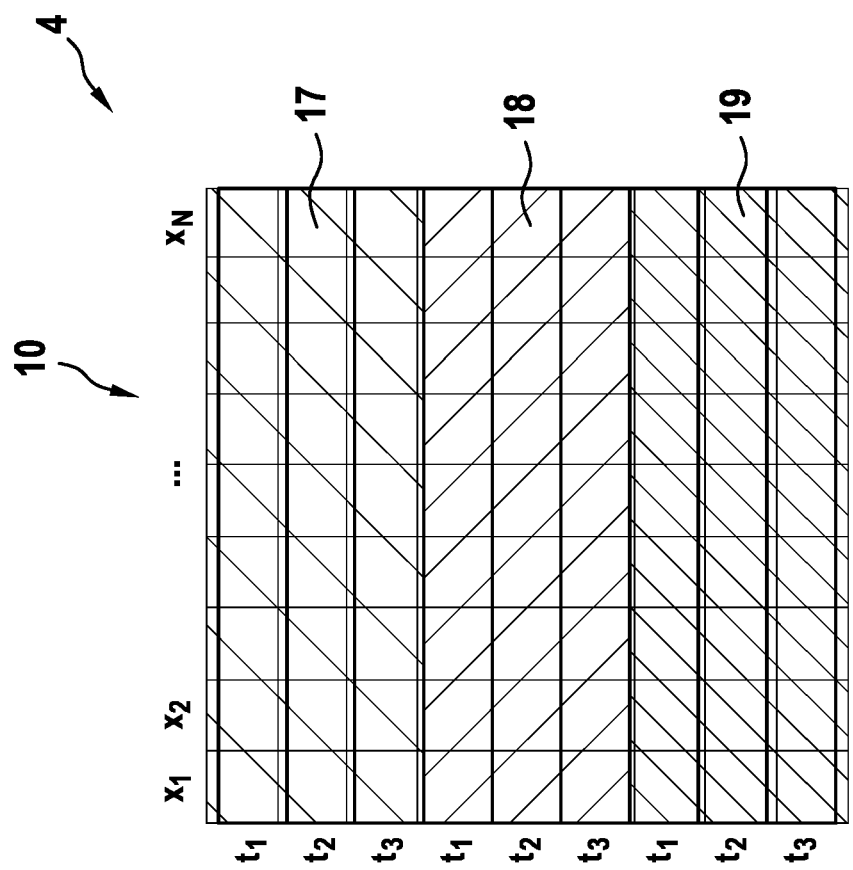
FIG. 4 shows a schematic representation of a receiving unit according to a third exemplary embodiment of the present invention.
Figure 4:
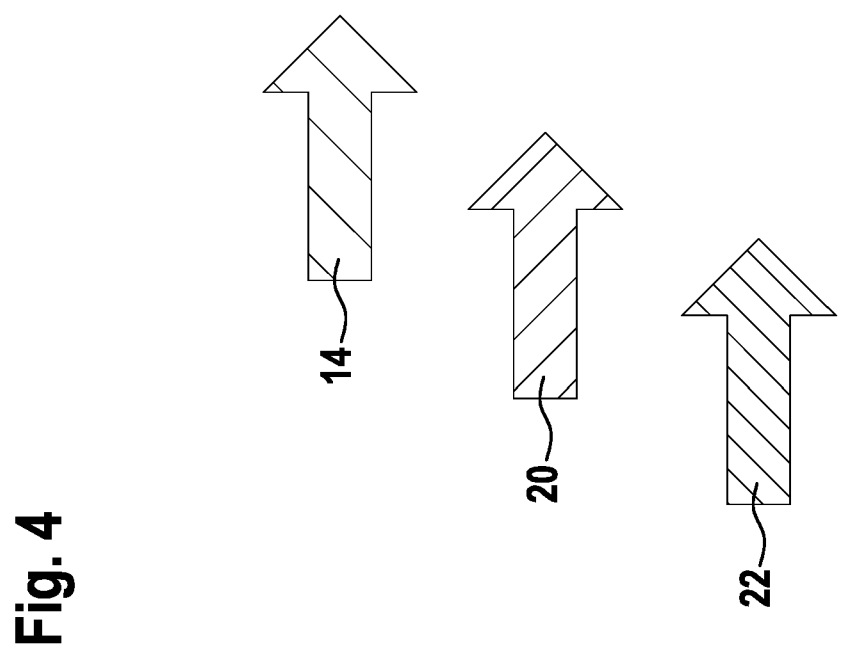

FIG. 4 shows a schematic representation of a receiving unit 4 according to a third exemplary embodiment of the present invention. In contrast to the exemplary embodiments already described, different sections 17, 18, 19 of detector 10 are activated, or deactivated again, successively or in parallel to one another, by control unit 4.

This may be implemented as an expansion of the second exemplary embodiment. The difference is that deflector 12 maps the first pulse on detector 10 during time period $t_1$-$t_3$, and thereafter continues the scanning, instead of returning to the beginning of detector 10. In this way, a second, and accordingly a third, pulse may be mapped on detector 10 in the subsequent area.

According to the exemplary embodiment of the present invention, a division of the sensor array or of detector 10 for the detection of multiple beams 14, 20, 22 takes place. In the process, the time resolution for each individual pulse 14, 20, 22 is reduced by the factor of three, but the necessary deflection frequency is also reduced, for example, from 770 kHz to 256 kHz. In this way, three signals 14, 20, 22 may be detected simultaneously in a detector image. Multiple sections 17, 18, 19 are available for each signal 14, 20, 22, which are encoded with corresponding runtimes $t_1$-$t_3$.

What is claimed is:

1. A LIDAR device for scanning a scanning area, comprising:
    a transmitting unit configured to generate beams and to deflect beams along the scanning area; and
    a receiving unit including at least one detector, having a plurality of detector pixels, configured to receive reflected beams, wherein: (i) individual sections of the detector are consecutively activatable at defined intervals for detection of the reflected beams, or (ii) the reflected beams are deflectable at a changing deflection angle by a deflector onto individual sections of the detector;
    wherein each of the detector pixels is encoded with a runtime, so that by image analysis in which the runtime is derived from an intensity distribution, a particular runtime is ascertainable depending on which of the detector pixels detects the reflected beams.

2. The LIDAR device as recited in claim 1, wherein the at least one detector is a CCD sensor or a detector array.

3. The LIDAR device as recited in claim 1, wherein the individual sections of the detector have a punctiform, or a planar, or a linear configuration.

4. The LIDAR device as recited in claim 1, wherein the deflector includes an acousto-optical modulator.

5. The LIDAR device as recited in claim 1, wherein the LIDAR device includes a control unit which is connected to the detector and the deflector.

6. The LIDAR device as recited in claim 1, wherein each of the sections of the detector is activatable or irradiatable at least once within a runtime span corresponding to a range of the LIDAR device.

7. The LIDAR device as recited in claim 1, wherein at least two beams, reflected with temporal offset, of different activated sections of the detector are detectable, or are guidable by the deflector onto different sections of the detector, or are consecutively guidable onto the detector.

8. A control apparatus for operating a LIDAR device, comprising:
    a control unit configured to control a deflector of the LIDAR device or a detector of the LIDAR device;
    wherein the LIDAR device includes:
        a transmitting unit to generate beams and to deflect the beams along the scanning area, and
        a receiving unit having at least one detector, having a plurality of detector pixels, to receive reflected beams, and
    wherein: (i) individual sections of the detector are consecutively activatable at defined intervals for detecting the reflected beams, or (ii) the reflected beams are deflectable at a changing deflection angle by the deflector onto individual sections of the detector;
    wherein each of the detector pixels is encoded with a runtime, so that by image analysis in which the runtime is derived from an intensity distribution, a particular runtime is ascertainable depending on which of the detector pixels detects the reflected beams.

9. A receiving unit for a LIDAR device, the LIDAR device including a transmitting unit configured to generate beams and deflect the beams along a scanning area, comprising:
    a detector, having a plurality of detector pixels, wherein individual sections of the detector are successively activatable at a uniform speed for detecting reflected beams, or wherein the individual sections of the detector are irradiatable with the reflected beams by a deflector at a changing deflection degree;
    wherein each of the detector pixels is encoded with a runtime, so that by image analysis in which the runtime is derived from an intensity distribution, a particular runtime is ascertainable depending on which of the detector pixels detects the reflected beams.

* * * * *